United States Patent
Tsukamoto et al.

(10) Patent No.: US 9,822,683 B2
(45) Date of Patent: Nov. 21, 2017

(54) EXHAUST GAS PURIFICATION SYSTEM FOR INTERNAL COMBUSTION ENGINE

(71) Applicants: Yoshihisa Tsukamoto, Susono (JP); Nobumoto Ohashi, Shizuoka-ken (JP); Shigeki Nakayama, Gotenba (JP); Akira Mikami, Susono (JP); Kenji Sakurai, Uji (JP); Hiroshi Otsuki, Gotenba (JP); Junichi Matsuo, Susono (JP); Keishi Takada, Kanagawa-ken (JP); Ichiro Yamamoto, Kariya (JP)

(72) Inventors: Yoshihisa Tsukamoto, Susono (JP); Nobumoto Ohashi, Shizuoka-ken (JP); Shigeki Nakayama, Gotenba (JP); Akira Mikami, Susono (JP); Kenji Sakurai, Uji (JP); Hiroshi Otsuki, Gotenba (JP); Junichi Matsuo, Susono (JP); Keishi Takada, Kanagawa-ken (JP); Ichiro Yamamoto, Kariya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 167 days.

(21) Appl. No.: 14/443,214

(22) PCT Filed: Nov. 16, 2012

(86) PCT No.: PCT/JP2012/079793
§ 371 (c)(1),
(2) Date: May 15, 2015

(87) PCT Pub. No.: WO2014/076815
PCT Pub. Date: May 22, 2014

(65) Prior Publication Data
US 2015/0292378 A1    Oct. 15, 2015

(51) Int. Cl.
*F01N 3/00* (2006.01)
*F01N 3/025* (2006.01)
(Continued)

(52) U.S. Cl.
CPC ....... *F01N 3/0253* (2013.01); *B01D 53/0415* (2013.01); *B01D 53/9477* (2013.01);
(Continued)

(58) Field of Classification Search
CPC .......... F01N 3/021; F01N 3/208; F01N 3/106; F01N 3/108; F01N 3/035; F01N 3/0253; F01N 3/2066; F01N 3/0231
See application file for complete search history.

(56) References Cited

U.S. PATENT DOCUMENTS

2005/0031514 A1    2/2005   Patchett et al.
2007/0137184 A1    6/2007   Patchett et al.
(Continued)

FOREIGN PATENT DOCUMENTS

JP    2007-501353    1/2007

*Primary Examiner* — Jonathan Matthias
*Assistant Examiner* — Jason Sheppard
(74) *Attorney, Agent, or Firm* — Finnegan, Henderson, Farabow, Garrett & Dunner, LLP

(57) ABSTRACT

An exhaust gas purification system for an internal combustion engine is provided with a filter including a selective catalytic reduction NOx catalyst carried thereon. Further, a post-catalyst is provided for an exhaust gas passage disposed on a downstream side from the filter. The post-catalyst has an oxidizing function, and the post-catalyst has such a function that the production of $N_2$ based on the oxidation of ammonia is facilitated in a predetermined first temperature area. A filter regeneration process execution unit is programmed to control the temperature of the post-catalyst to be in the first temperature area while adjusting the temperature of the filter to be in a predetermined second temperature (Continued)

area lower than a filter regeneration temperature during a certain period of time.

7 Claims, 7 Drawing Sheets

(51) Int. Cl.
    F01N 3/10 (2006.01)
    F01N 3/20 (2006.01)
    F02D 41/02 (2006.01)
    F01N 9/00 (2006.01)
    F02D 41/40 (2006.01)
    F01N 3/023 (2006.01)
    F01N 3/035 (2006.01)
    F01N 13/00 (2010.01)
    B01D 53/04 (2006.01)
    F01N 3/021 (2006.01)
    F01N 3/029 (2006.01)
    F01N 3/28 (2006.01)
    B01D 53/94 (2006.01)

(52) U.S. Cl.
    CPC ......... *B01D 53/9495* (2013.01); *F01N 3/021* (2013.01); *F01N 3/0231* (2013.01); *F01N 3/0293* (2013.01); *F01N 3/035* (2013.01); *F01N 3/103* (2013.01); *F01N 3/106* (2013.01); *F01N 3/208* (2013.01); *F01N 3/2066* (2013.01); *F01N 3/2882* (2013.01); *F01N 9/002* (2013.01); *F01N 13/009* (2014.06); *F02D 41/029* (2013.01); *F02D 41/405* (2013.01); *B01D 53/944* (2013.01); *B01D 53/9418* (2013.01); *B01D 2251/2062* (2013.01); *B01D 2255/1021* (2013.01); *B01D 2255/20738* (2013.01); *B01D 2255/20761* (2013.01); *B01D 2255/50* (2013.01); *B01D 2255/9155* (2013.01); *B01D 2257/406* (2013.01); *B01D 2257/502* (2013.01); *B01D 2257/702* (2013.01); *B01D 2258/012* (2013.01); *F01N 2560/06* (2013.01); *F01N 2560/14* (2013.01); *F01N 2610/02* (2013.01); *F01N 2610/03* (2013.01); *F01N 2900/1404* (2013.01); *F01N 2900/1602* (2013.01); *F01N 2900/1622* (2013.01); *F02D 2200/0802* (2013.01); *F02D 2200/0812* (2013.01); *Y02T 10/24* (2013.01); *Y02T 10/44* (2013.01); *Y02T 10/47* (2013.01)

(56) References Cited

U.S. PATENT DOCUMENTS

| | | |
|---|---|---|
| 2008/0132405 A1 | 6/2008 | Patchett et al. |
| 2009/0255241 A1 | 10/2009 | Patchett et al. |
| 2011/0058999 A1* | 3/2011 | Ettireddy ........... B01D 53/9418 423/213.5 |
| 2012/0034133 A1 | 2/2012 | Patchett et al. |
| 2014/0349841 A1 | 11/2014 | Patchett et al. |
| 2015/0011377 A1 | 1/2015 | Patchett et al. |

* cited by examiner

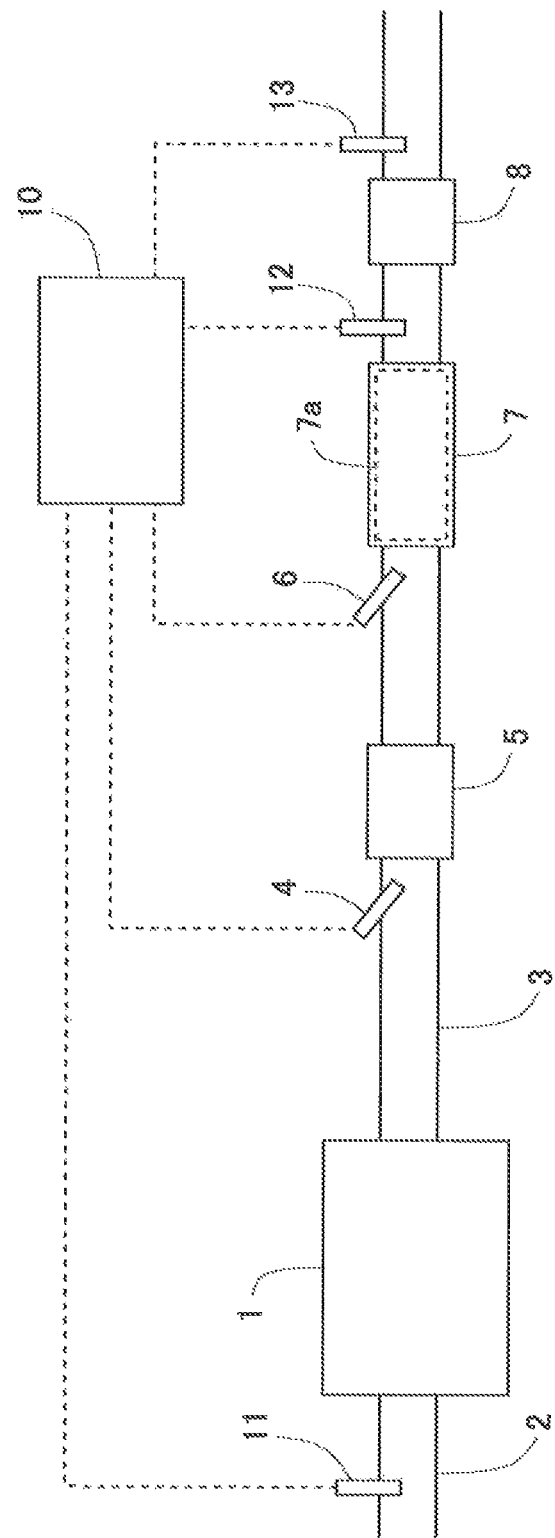
[Fig. 1]

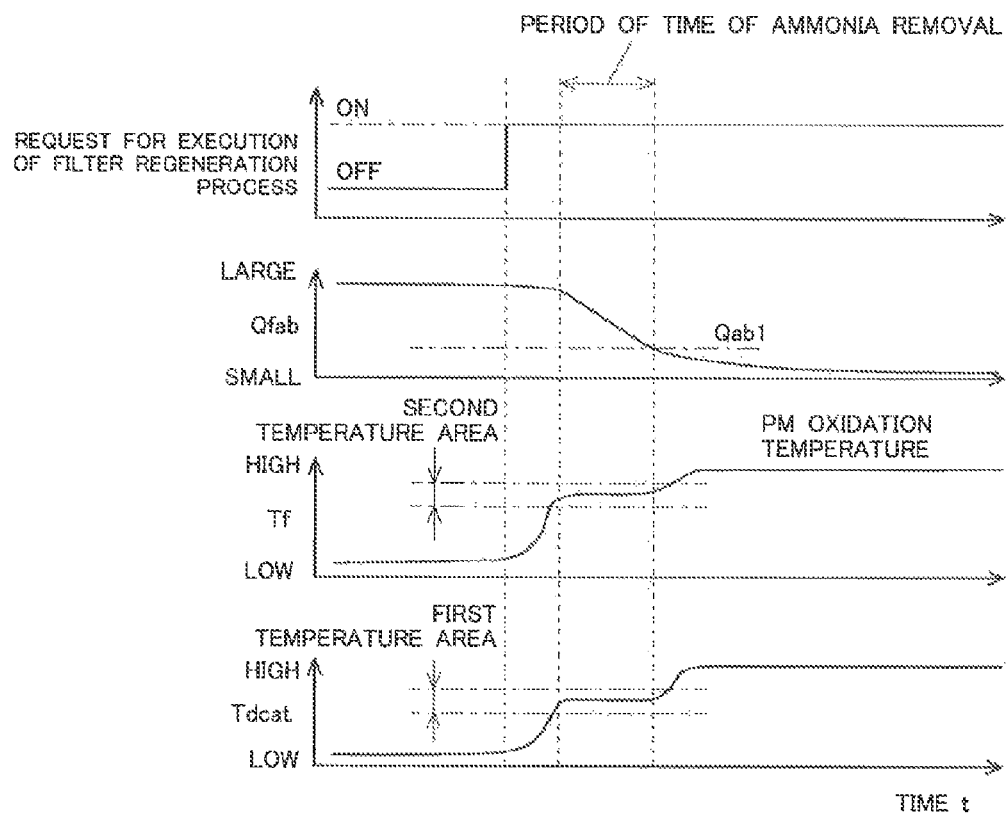
[Fig. 2]

[Fig. 3]
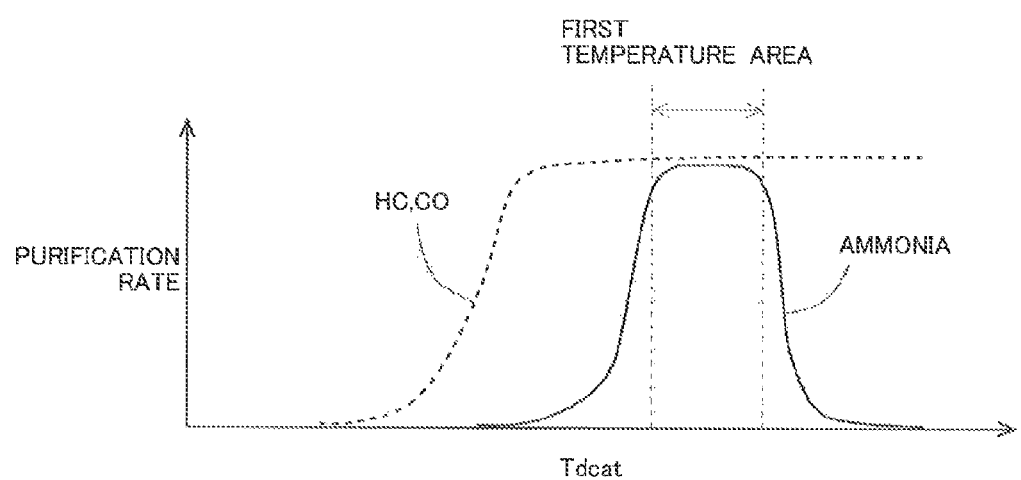

[Fig. 4]
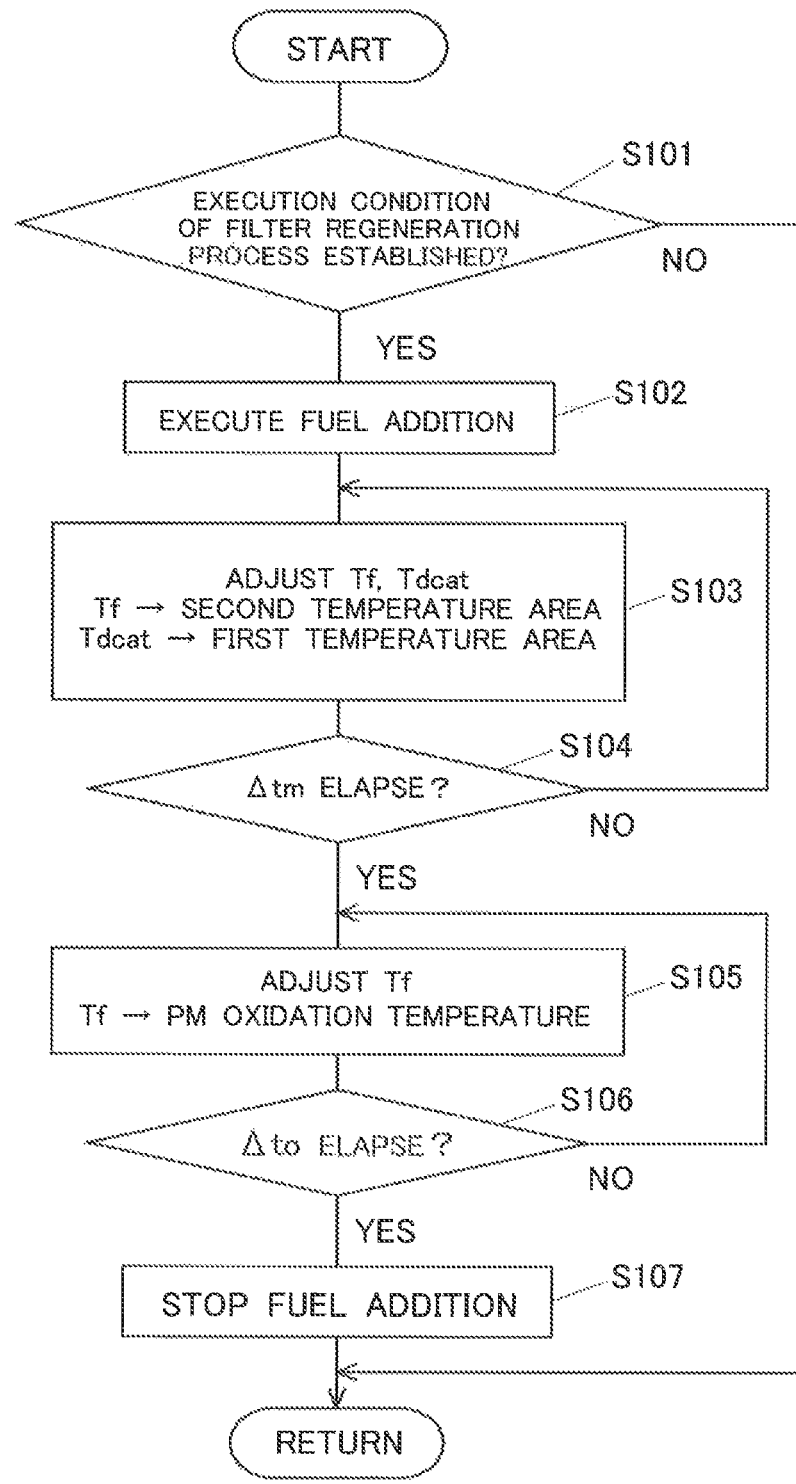

[Fig. 5]
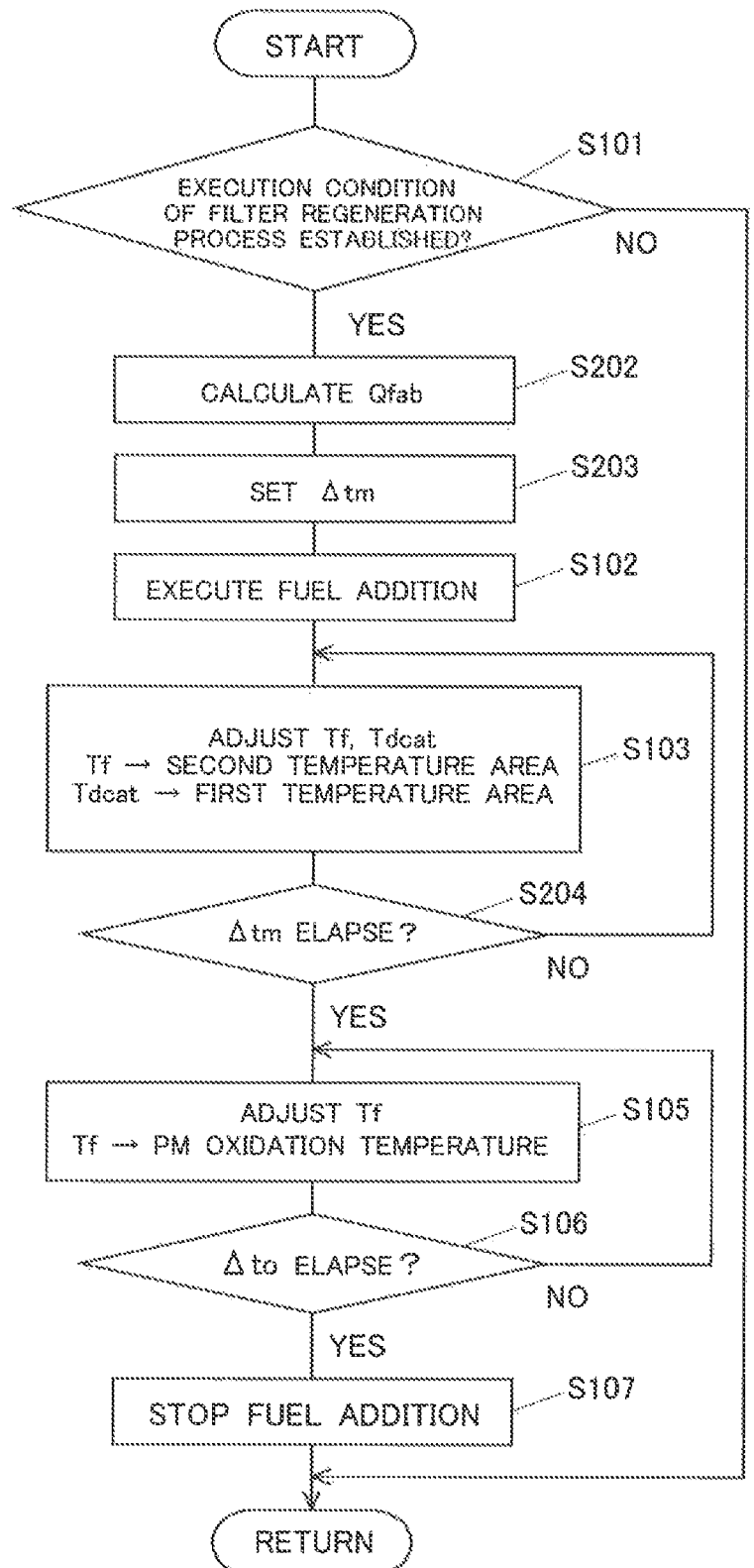

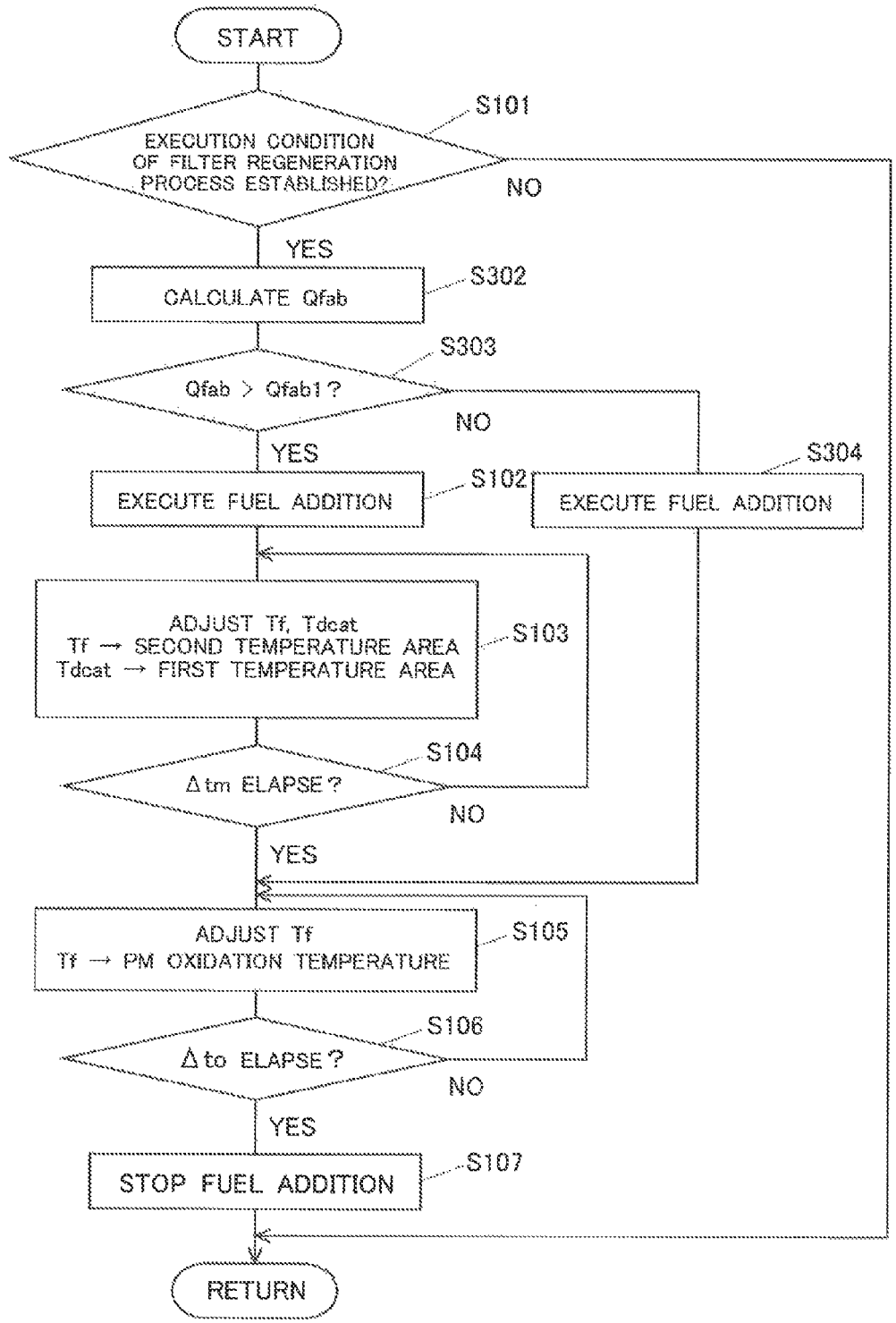
[Fig. 6]

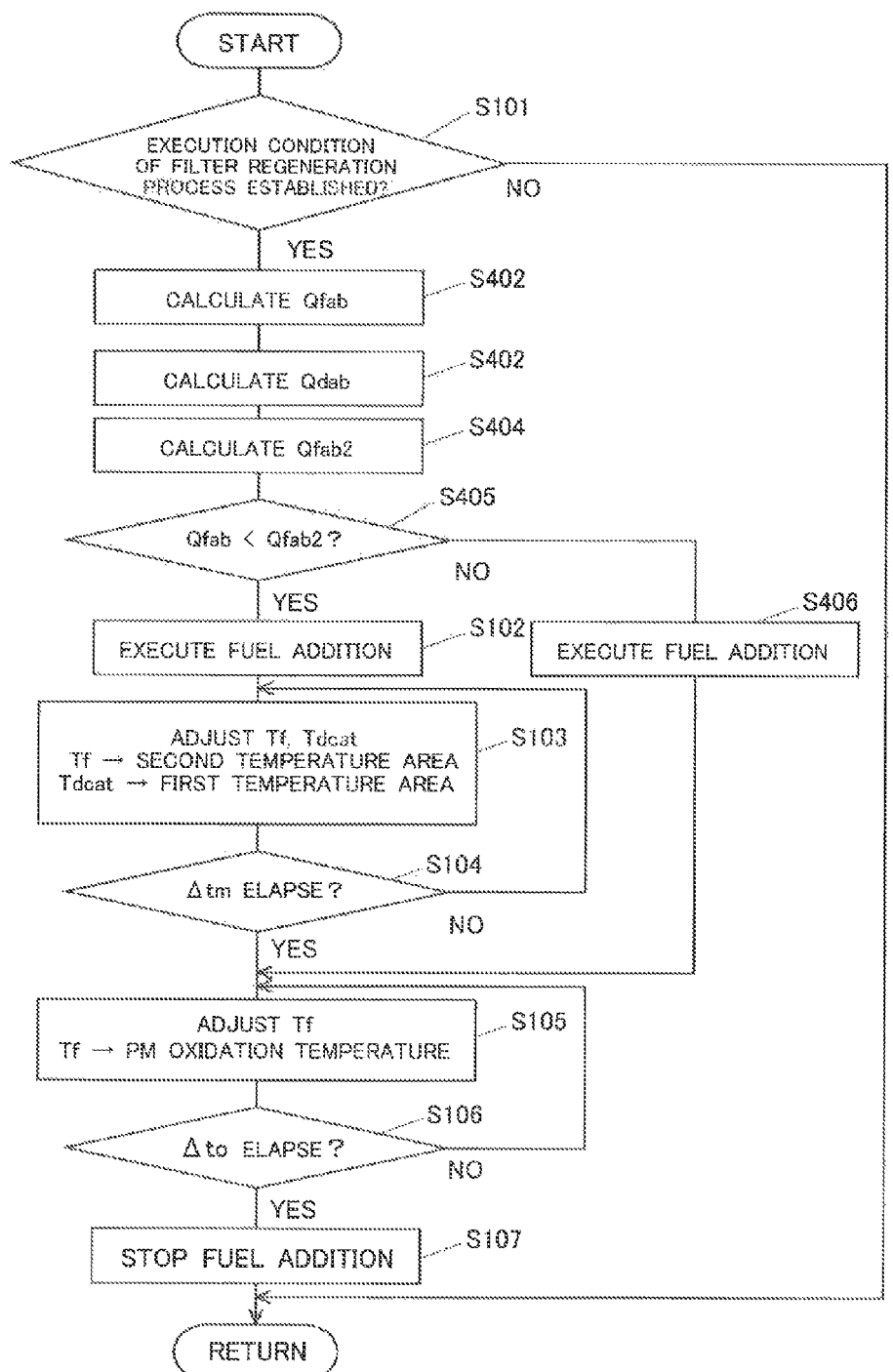

EXHAUST GAS PURIFICATION SYSTEM FOR INTERNAL COMBUSTION ENGINE

CROSS-REFERENCE TO RELATED APPLICATIONS

This application is a national phase application of International Application No. PCT/JP2012/079793, filed Nov. 16, 2012, the content of which is incorporated herein by reference.

TECHNICAL FIELD

The present invention relates to an exhaust gas purification system for an internal combustion engine.

BACKGROUND ART

Conventionally, an exhaust gas purification apparatus provided for an exhaust gas passage of an internal combustion engine has been developed, in which a selective catalytic reduction NOx catalyst (hereinafter referred to as "SCR catalyst") is carried on a filter (see, for example, Patent Document 1). The filter traps the particulate matter (hereinafter referred to as "PM") contained in the exhaust gas. The SCR catalyst reduces NOx contained in the exhaust gas by using ammonia ($NH_3$) as a reducing agent. The filter, which carries the SCR catalyst as described above, is hereinafter referred to as "SCRF" in some cases.

When SCRF is adopted as the exhaust gas purification apparatus, it is possible to further decrease the size of the exhaust gas purification apparatus as compared with a case in which the filter and the SCR catalyst are separately provided for the exhaust gas passage. Therefore, it is possible to improve the installation performance of the exhaust gas purification apparatus. Further, when SCRF is adopted, the SCR catalyst can be arranged on the more upstream side in the exhaust gas passage. The more upstream the SCR catalyst is arranged in the exhaust gas passage, the more easily the SCR catalyst is heated by the heat of the exhaust gas. Therefore, it is possible to improve the warming-up performance of the SCR catalyst, and it is possible to improve the NOx purification rate of the SCR catalyst.

In this arrangement, trapped PM is accumulated on SCRF. Therefore, the filter regeneration process is executed in an exhaust gas purification system provided with SCRF. The filter regeneration process is the process in which PM accumulated on SCRF is removed by oxidizing PM. The filter regeneration process is realized by supplying the fuel to a pre-catalyst which has the oxidizing function and which is provided for the exhaust gas passage on the downstream side from SCRF. When the fuel is oxidized by the pre-catalyst, the exhaust gas, which flows into SCRF, is heated by the heat of combustion (heat of oxidation). Therefore, the temperature of SCRF can be raised to the filter regeneration temperature at which the oxidation of PM is facilitated.

PRIOR ART DOCUMENTS

Patent Documents

Patent Document 1: Japanese Unexamined Patent Application Publication No. 2007-501353

SUMMARY OF THE INVENTION

Problems to be Solved by the Invention

Ammonia or an ammonia precursor is supplied to SCRF. Then, NOx contained in the exhaust gas is reduced by using ammonia as a reducing agent by means of the SCR catalyst carried on SCRF. In this case, when ammonia is oxidized, NOx is produced in some cases. It is necessary that the production of NOx, which is caused as described above, should be suppressed. Therefore, it is difficult to allow SCRF to carry a catalyst having a high oxidizing ability. Therefore, the SCR catalyst, which is carried on SCRF, has an extremely low oxidizing ability.

When the filter regeneration process is executed as described above, a part of hydrocarbon (HC), which is contained in the fuel supplied to the pre-catalyst, sometimes passes through the pre-catalyst without being oxidized by the pre-catalyst. HC, which passes through the pre-catalyst, flows into SCRF. However, as described above, the SCR catalyst, which is carried on SCRF, has the extremely low oxidizing ability. Therefore, if HC passes through the pre-catalyst, HC also passes through SCRF.

Further, when PM, which is accumulated on SCRF, is oxidized in accordance with the execution of the filter regeneration process, carbon monoxide (CO) is produced. CO is hardly oxidized by SCRF as well. Therefore, when the filter regeneration process is executed, it is feared that HC contained in the fuel and CO produced by the oxidation of PM may flow out from SCRF.

Further, when the filter regeneration process is executed, SCRF has a high temperature. Therefore, if the filter regeneration process is executed in a state in which ammonia adheres to the SCR catalyst of SCRF, NOx is produced in accordance with the oxidation of ammonia. In this situation, it is feared that NOx, which is produced in SCRF, may flow out from SCRF without being reduced.

The present invention has been made taking the foregoing problem into consideration, an object of which is to provide a technique which makes it possible to suppress HC, CO, and NOx from being discharged to the outside when a filter regeneration process is executed in an exhaust gas purification system for an internal combustion engine provided with SCRF.

Means for Solving the Problems

In the present invention, a post-catalyst is provided for an exhaust gas passage disposed on a downstream side from SCRF. The post-catalyst has an oxidizing function, and the post-catalyst has such a function that the production of $N_2$ based on the oxidation of ammonia is facilitated in a predetermined first temperature area. Further, when a filter regeneration process is executed, then the temperature of the post-catalyst is adjusted to be in the first temperature area while adjusting the temperature of SCRF to be in a predetermined second temperature area lower than a filter regeneration temperature during a certain period of time, and then the temperature of SCRF is adjusted to the filter regeneration temperature.

More specifically, according to the present invention, there is provided an exhaust gas purification system for an internal combustion engine, comprising:

a pre-catalyst which is provided for an exhaust gas passage of the internal combustion engine and which has an oxidizing function;

a fuel supply device which supplies fuel to the pre-catalyst;

a filter which is provided for the exhaust gas passage on a downstream side from the pre-catalyst and which traps particulate matter contained in an exhaust gas, the filter (SCRF) including a selective catalytic reduction NOx catalyst carried thereon for reducing NOx contained in the exhaust gas by using ammonia as a reducing agent;

an ammonia supply device configured to supply ammonia or an ammonia precursor to the filter;

a post-catalyst which is provided for the exhaust gas passage on a downstream side from the filter, which has an oxidizing function, and which has such a function that production of $N_2$ based on oxidization of ammonia is facilitated in a predetermined first temperature area; and a filter regeneration process execution unit configured to execute a filter regeneration process for raising a temperature of the filter to a predetermined filter regeneration temperature at which oxidation of the particulate matter is facilitated, by supplying the fuel from the fuel supply device to the pre-catalyst so that the particulate matter accumulated on the filter is thereby oxidized and removed, wherein:

the filter regeneration process execution unit controls a temperature of the exhaust gas flowing into the filter, when the filter regeneration process execution unit executes the filter regeneration process, so that, during a certain period of time, the temperature of the filter is adjusted to be in a predetermined second temperature area which is lower than the filter regeneration temperature and which provides an increasing amount of ammonia released from the carried selective catalytic reduction NOx catalyst and flowing out from the filter without being oxidized, a temperature of the post-catalyst is adjusted to be in the first temperature area, and then adjusts the temperature of the filter to the filter regeneration temperature.

In the exhaust gas purification system for the internal combustion engine according to the present invention, the pre-catalyst, SCRF, and the post-catalyst are provided in this order from the upstream side in the exhaust gas passage of the internal combustion engine. Ammonia or the ammonia precursor is supplied to SCRF from the ammonia supply device. In the SCR catalyst carried on SCRF, NOx contained in the exhaust gas is reduced by using, as the reducing agent, supplied ammonia or ammonia produced from the supplied ammonia precursor. Further, the filter regeneration process, which is performed in order to remove PM accumulated on SCRF, is realized by the supply of the fuel to the pre-catalyst from the fuel supply device.

The post-catalyst, which is provided for the exhaust gas passage disposed on the downstream side from SCRF, has the oxidizing function in the exhaust gas purification system for the internal combustion engine according to the present invention. Therefore, even if HC and/or CO flow(s) out from SCRF when the filter regeneration process is executed, then it is possible to oxidize HC and/or CO by means of the post-catalyst. Therefore, it is possible to suppress the discharge of HC and CO to the outside.

Further, the post-catalyst has such a function that the production of $N_2$, which is based on the oxidization of supplied ammonia, is facilitated when ammonia is supplied if the temperature is in the predetermined first temperature area. However, if the temperature of SCRF is raised to the filter regeneration temperature in accordance with the execution of the filter regeneration process, the temperature of the exhaust gas flowing into the post-catalyst becomes extremely high. As a result, the temperature of the post-catalyst is higher than that of the first temperature area. In this situation, ammonia is oxidized in the post-catalyst, and thus NOx tends to be produced as compared with $N_2$.

In view of the above, in the present invention, the temperature of the exhaust gas flowing into SCRF is controlled when the filter regeneration process is executed. Accordingly, the temperature of SCRF is adjusted to be in the second temperature area, and the temperature of the post-catalyst is adjusted to be in the first temperature area during the certain period of time. In this case, the second temperature area is the temperature area which is lower than the filter regeneration temperature and which provides the increasing amount of ammonia released from the SCR catalyst carried on SCRF and flowing out from SCRF without being oxidized. The period of time, in which the temperature of SCRF is adjusted to be in the second temperature area and the temperature of the post-catalyst is adjusted to be in the first temperature area, is hereinafter sometimes referred to as "period of time of ammonia removal".

The temperature of SCRF is adjusted to be in the second temperature area, and thus it is possible to release ammonia adsorbed in the SCR catalyst carried on SCRF. Further, the released ammonia can be supplied to the post-catalyst without being oxidized. Then, in this situation, the temperature of the post-catalyst is adjusted to be in the first temperature area, and thus the supplied ammonia can be oxidized and converted into $N_2$ by means of the post-catalyst. Therefore, it is possible to decrease, during the period of time of ammonia removal, the ammonia adsorption amount adsorbed in the SCR catalyst carried on the SCR catalyst. Further, it is possible to suppress such a situation that ammonia adsorbed in the SCR catalyst carried on SCRF is discharged to the outside. Furthermore, it is possible to suppress such a situation that ammonia is converted into NOx by being oxidized and ammonia is discharged to the outside.

Thus, in the present invention, the temperature of SCRF is further raised so that the temperature of SCRF is adjusted to the filter regeneration temperature after the elapse of the period of time of ammonia removal, i.e., after the decrease in the ammonia adsorption amount adsorbed in the SCR catalyst carried on SCRF. Accordingly, it is possible to reduce the amount of NOx produced by the oxidation of ammonia when the temperature of SCRF is adjusted to the filter regeneration temperature. As a result, it is possible to suppress the discharge of NOx to the outside.

The post-catalyst according to the present invention may be constructed to include an oxidation catalyst and an SCR catalyst for reducing NOx contained in the exhaust gas by using ammonia as a reducing agent, and the post-catalyst may have such a function that NOx is produced by oxidizing ammonia in the first temperature area, and the produced NOx is reduced by using excessive ammonia as the reducing agent. Accordingly, HC and CO, which flow into the post-catalyst, can be oxidized by the oxidation catalyst. Further, ammonia, which is supplied to the post-catalyst, is not only converted into $N_2$, but a part of ammonia is also oxidized by means of the oxidation catalyst to produce NOx thereby. Furthermore, produced NOx can be reduced by means of the SCR catalyst by using excessive ammonia as the reducing agent. Moreover, if NOx contained in the exhaust gas, which is discharged from the internal combustion engine during the ordinary operation (during the period in which the filter regeneration process is not executed), passes through SCRF, NOx can be also reduced by means of the SCR catalyst which constitutes the post-catalyst.

The exhaust gas purification system for the internal combustion engine according to the present invention may comprise a first estimating unit configured to estimate an ammonia adsorption amount adsorbed in the SCR catalyst carried on SCRF. In this case, the exhaust gas purification system for the internal combustion engine according to the present invention may further comprise a setting unit configured to set a length of the period of time of ammonia removal on the basis of the ammonia adsorption amount adsorbed in the SCR catalyst carried on SCRF when an execution condition of the filter regeneration process is established.

The larger the ammonia adsorption amount adsorbed in the SCR catalyst carried on SCRF is, the longer the time required to release ammonia from the SCR catalyst by adjusting the temperature of SCRF to be in the second temperature area and sufficiently decrease the ammonia adsorption amount adsorbed in the SCR catalyst thereby is. In other words, the smaller the ammonia adsorption amount adsorbed in the SCR catalyst carried on SCRF is, the shorter the time required to release ammonia from the SCR catalyst by adjusting the temperature of SCRF to be in the second temperature area and sufficiently decrease the ammonia adsorption amount adsorbed in the SCR catalyst thereby is. In view of the above, in the case of the foregoing situation, the smaller the ammonia adsorption amount adsorbed in the SCR catalyst carried on SCRF when the execution condition of the filter regeneration process is established is, the shorter the period of time of ammonia removal set by the setting unit is.

Accordingly, the increase in the discharge amount of NOx to the outside during the execution of the filter regeneration process, which would be otherwise caused by the excessively short period of time of ammonia removal, can be suppressed. Further, the decrease in the efficiency of the filter regeneration process, which would be otherwise caused by the excessively long period of time of ammonia removal, can be also suppressed.

Further, in the exhaust gas purification system for the internal combustion engine according to the present invention, the filter regeneration process execution unit may adjust the temperature of SCRF to the filter regeneration temperature without performing the adjustment the temperature of the filter to be in the second temperature area and the adjustment the temperature of the post-catalyst to be in the first temperature area, if an ammonia adsorption amount adsorbed in the SCR catalyst carried on SCRF, when an execution condition of the filter regeneration process is established, is not more than a first reference adsorption amount.

In this case, the first reference adsorption amount may be an upper limit value of the ammonia adsorption amount at which the outflow amount of NOx is within an allowable range even if ammonia, which is adsorbed in the SCR catalyst carried on SCRF, is oxidized to produce NOx which flows out from SCRF on account of the fact that the temperature of SCRF becomes the filter regeneration temperature.

According to the feature as described above, the removal of PM accumulated on SCRF is started as promptly as possible, if the adsorption amount of ammonia adsorbed in the SCR catalyst carried on SCRF is not more than the first reference adsorption amount when the execution condition of the filter regeneration process is established. Therefore, it is possible to improve the efficiency of the filter regeneration process, while suppressing the discharge of NOx to the outside to be within the allowable range when the filter regeneration process is executed.

Further, when the post-catalyst according to the present invention is constructed to include the oxidation catalyst and the SCR catalyst which reduces NOx contained in the exhaust gas by using ammonia as the reducing agent, ammonia is also adsorbed to the post-catalyst as well. In view of the above, in this case, the exhaust gas purification system for the internal combustion engine according to the present invention may further comprise a second estimating unit configured to estimate an ammonia adsorption amount adsorbed in the post-catalyst, in addition to a first estimating unit. Further, the filter regeneration process execution unit may adjust the temperature of SCRF to the filter regeneration temperature without performing the adjustment the temperature of the filter to be in the second temperature area and the adjustment the temperature of the post-catalyst to be in the first temperature area, if an ammonia adsorption amount adsorbed in the post-catalyst, when an execution condition of the filter regeneration process is established, is not less than a second reference adsorption amount.

In this case, the second reference adsorption amount has a value which is determined depending on an ammonia adsorption amount adsorbed in the SCR catalyst carried on SCRF when the execution condition of the filter regeneration process is established. The second reference adsorption amount may be a lower limit value of the ammonia adsorption amount with which NOx can be sufficiently reduced by means of the post-catalyst, if ammonia, which is adsorbed in the SCR catalyst carried on SCRF at the point in time of the establishment of the execution condition of the filter regeneration process, is oxidized in accordance with the temperature of SCRF raised to the filter regeneration temperature to produce NOx which flows into the post-catalyst.

According to the feature as described above, if the ammonia adsorption amount adsorbed in the post-catalyst, when the execution condition of the filter regeneration process is established, is not less than the second reference adsorption amount, the removal of PM accumulated on SCRF is started as promptly as possible. Therefore, it is possible to improve the efficiency of the filter regeneration process, while suppressing the discharge of NOx to the outside to be within the allowable range during the execution of the filter regeneration process.

Advantageous Effect of the Invention

According to the present invention, it is possible to suppress the discharge of HC, CO, and NOx to the outside during the execution of the filter regeneration process in the exhaust gas purification system for the internal combustion engine provided with SCRF.

BRIEF DESCRIPTION OF THE DRAWINGS

FIG. 1 shows a schematic arrangement of an intake/exhaust system of an internal combustion engine according to a first embodiment.

FIG. 2 shows a time chart illustrating the transition of the ammonia adsorption amount Qfab adsorbed in an SCR catalyst carried on SCRF, the temperature Tf of SCRF, and the temperature Tdcat of a post-catalyst during the execution of a filter regeneration process according to the first embodiment.

FIG. 3 shows a relationship among the temperature Tdcat of the post-catalyst, the removal rate of CO and HC concerning the post-catalyst, and the removal rate of ammonia according to the first embodiment.

FIG. 4 shows a flow chart illustrating a flow of the filter regeneration process according to the first embodiment.

FIG. 5 shows a flow chart illustrating a flow of a filter regeneration process according to a second embodiment.

FIG. 6 shows a flow chart illustrating a flow of a filter regeneration process according to a third embodiment.

FIG. 7 shows a flow chart illustrating a flow of a filter regeneration process according to a fourth embodiment.

EMBODIMENTS FOR CARRYING OUT THE INVENTION

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.

First Embodiment

An explanation will now be made about a case in which the exhaust gas purification system for the internal combustion engine according to the present invention is applied to a diesel engine for driving a vehicle. However, the internal combustion engine according to the present invention is not limited to the diesel engine, which may be, for example, a gasoline engine.
(Schematic Arrangement of Intake/Exhaust System)

FIG. 1 shows a schematic arrangement of an intake/exhaust system of the internal combustion engine according to this embodiment. The internal combustion engine 1 is the diesel engine for driving the vehicle. An intake gas passage 2 and an exhaust gas passage 3 are connected to the internal combustion engine 1. An air flow meter 11, which detects the intake air amount of the internal combustion engine 1, is provided for the intake gas passage 2.

A fuel addition valve 4, a pre-catalyst (front stage catalyst) 5, an ammonia addition valve 6, SCRF 7, a first exhaust gas temperature sensor 12, a post-catalyst (back stage catalyst) 8, and a second exhaust gas temperature sensor 13 are provided for the exhaust gas passage 3 in an order as referred from the upstream side along with the flow of the exhaust gas.

The pre-catalyst 5 is an oxidation catalyst. However, the pre-catalyst 5 may be any catalyst other than the oxidation catalyst provided that the catalyst has the oxidizing function. The fuel addition valve 4 adds the fuel into the exhaust gas in order to supply the fuel to the pre-catalyst 5.

In this embodiment, the fuel addition valve 4 corresponds to the fuel supply device according to the present invention. However, the fuel can be also supplied to the pre-catalyst 5 without providing the fuel addition valve 4 such that the subsidiary fuel injection is executed at a timing at which the injected fuel is not subjected to the combustion and the injected fuel is discharged in an unburned state to the exhaust gas passage 3 in the internal combustion engine 1.

SCRF 7 is constructed such that an SCR catalyst 7a is carried on a wall flow type filter for trapping PM contained in the exhaust gas. The SCR catalyst 7a reduces NOx contained in the exhaust gas by using ammonia as the reducing agent. The ammonia addition valve 6 adds ammonia gas into the exhaust gas in order to supply ammonia to SCRF 7. When ammonia is supplied to SCRF 7, the ammonia is once adsorbed to the SCR catalyst 7a carried on SCRF 7. Further, the adsorbed ammonia behaves as the reducing agent, and NOx contained in the exhaust gas is reduced.

In this embodiment, the ammonia addition valve 6 corresponds to the ammonia supply device according to the present invention. However, the ammonia supply device according to the present invention may be a device which supplies ammonia as liquid or solid. Further, the ammonia supply device according to the present invention may be a device which supplies an ammonia precursor. For example, in this embodiment, it is also allowable to provide a urea addition valve for adding an aqueous urea solution into the exhaust gas, in place of the ammonia addition valve 6. In this case, urea is supplied as the ammonia precursor to SCRF 7. Then, urea is hydrolyzed, and thus ammonia is produced.

The post-catalyst 8 is a catalyst which is constructed by combining an oxidation catalyst and an SCR catalyst for reducing NOx contained in the exhaust gas by using ammonia as the reducing agent. In the case of the post-catalyst 8, for example, the oxidation catalyst may be formed by carrying a noble metal (precious metal) such as platinum (Pt) or the like on a carrier made of a material of aluminum oxide ($Al_2O_3$), zeolite or the like, and the SCR catalyst may be formed by carrying a base metal (nonprecious metal) such as copper (Cu), iron (Fe) or the like on a carrier made of a material of zeolite. Owing to the construction as described above, the post-catalyst 8 has the oxidizing function, and the post-catalyst has the function in which the production of $N_2$ based on the oxidation of ammonia is facilitated in the predetermined first temperature area. Further, the post-catalyst 8 has the function in which NOx is produced by oxidizing ammonia and the produced NOx is reduced by using excessive ammonia as the reducing agent in the first temperature area.

The first exhaust gas temperature sensor 12 and the second exhaust gas temperature sensor 13 are sensors which detect the temperature of the exhaust gas. An electronic control unit (ECU) 10 is provided in combination with the internal combustion engine 1. Various sensors, which include, for example, the air flow meter 11, the first exhaust gas temperature sensor 12, and the second exhaust gas temperature sensor 13, are electrically connected to ECU 10. Then, output signals of various sensors are inputted into ECU 10. ECU 10 estimates the flow rate of the exhaust gas in the exhaust gas passage 3 on the basis of the output value of the air flow meter 11. Further, ECU 10 estimates the temperature of the SCRF 7 on the basis of the output value of the first exhaust gas temperature sensor 12, and ECU 10 estimates the temperature of the post-catalyst 8 on the basis of the output value of the second exhaust gas temperature sensor 13.

Further, the fuel addition valve 4 and the ammonia addition valve 6 are electrically connected to ECU 10. Then, the devices as described above are controlled by ECU 10.
(Filter Regeneration Process)

Collected PM is gradually accumulated on SCRF 7. Thus, in this embodiment, the filter regeneration process is executed in order to remove PM accumulated on SCRF 7. The filter regeneration process according to this embodiment is realized such that the fuel is added from the fuel addition valve 4, and the fuel is thereby supplied to the pre-catalyst 5. When the fuel is oxidized by the pre-catalyst 5, the heat of combustion (heat of oxidation) is generated. The exhaust gas, which flows into SCRF 7, is heated by the heat of combustion. Accordingly, the temperature of SCRF 7 is raised. When the filter regeneration process is executed, then the fuel addition amount added from the fuel addition valve 4 is controlled, and thus the temperature of SCRF 7 is raised to a predetermined filter regeneration temperature (for example, 600 to 650° C.) at which the oxidation of PM is facilitated. As a result, PM accumulated on SCRF 7 is oxidized and removed.

In this embodiment, the filter regeneration process is executed every time when a predetermined time elapses. Note that the filter regeneration process may be executed every time when the vehicle, which carries the internal combustion engine 1, travels a predetermined travel distance. Further, the filter regeneration process may be executed every time when the PM accumulation amount of SCRF 7 arrives at a predetermined accumulation amount. The PM accumulation amount of SCRF 7 can be estimated on the basis of the history or record of, for example, the fuel injection amount of the internal combustion engine 1, the flow rate of the exhaust gas flowing into SCRF 7, and the temperature of SCRF 7.

When the filter regeneration process is executed as described above, a part of HC, which is contained in the fuel supplied to the pre-catalyst 5, sometimes passes through the pre-catalyst 5 without being oxidized by the pre-catalyst 5. HC, which has passed through the pre-catalyst 5, flows into SCRF 7. However, the SCR catalyst 7a, which is carried on SCRF 7, has the extremely low oxidizing ability. Therefore, HC is hardly oxidized by the SCR catalyst 7a. For this reason, HC, which has passed through the pre-catalyst 5, also passes through SCRF 7.

Further, when PM accumulated on SCRF 7 is oxidized in accordance with the execution of the filter regeneration process, CO is produced. CO is hardly oxidized by SCRF 7 as well. Therefore, when the filter regeneration process is executed, it is feared that CO, which is produced by the oxidation of PM and HC contained in the fuel, may flow out from SCRF 7.

However, in this embodiment, the post-catalyst 8, which has the oxidizing function, is provided on the downstream side from SCRF 7 in the exhaust gas passage 8. When the filter regeneration process is executed, the exhaust gas having a high temperature flows into the post-catalyst 8. Therefore, the oxidizing function of the post-catalyst 8 is sufficiently activated. Then, when HC and CO flow out from SCRF 7, they are oxidized by the post-catalyst 8. Therefore, in this embodiment, it is possible to suppress HC and CO from being discharged to the outside during the execution of the filter regeneration process.

Further, the post-catalyst 8 includes the SCR catalyst. Therefore, when NOx contained in the exhaust gas, which is discharged from the internal combustion engine 1 during the ordinary operation (i.e., during the period in which the filter regeneration process is not executed), passes through SCRF 7, NOx can be also reduced by means of the post-catalyst 8.

Further, ammonia, which is supplied from the ammonia addition valve 6, adsorbs to the SCR catalyst 7a carried on SCRF 7. When the filter regeneration process is executed in the state in which ammonia adsorbs to the SCR catalyst 7a, and the temperature of SCRF 7 is raised to the filter regeneration temperature thereby, then NOx is produced by the oxidization of ammonia which is to serve as the reducing agent. In such a situation, it is feared that NOx produced in SCRF 7 may flow out from SCRF 7 without being reduced.

In view of the above, in this embodiment, after the establishment of the execution condition of the filter regeneration process, during a certain period of time (period of time of ammonia removal), the temperature of SCRF 7 is adjusted to be in the predetermined second temperature area lower than the filter regeneration temperature and the temperature of the post-catalyst 8 is adjusted to be in the first temperature area. After that, the temperature of SCRF 7 is raised to the filter regeneration temperature.

FIG. 2 shows a time chart illustrating the transition of the ammonia adsorption amount Qfab adsorbed in the SCR catalyst 7a carried on SCRF 7, the temperature Tf of SCRF 7, and the temperature Tdcat of the post-catalyst 8 during the execution of the filter regeneration process according to this embodiment. FIG. 3 shows a relationship among the temperature Tdcat of the post-catalyst 8, the removal rate of CO and HC concerning the post-catalyst 8, and the removal rate of ammonia according to this embodiment. In FIG. 3, the horizontal axis represents the temperature Tdcat of the post-catalyst 8, and the vertical axis represents the removal rate of CO and HC or ammonia in the post-catalyst 8. Further, in FIG. 3, the broken line indicates the removal rate of CO and HC, and the solid line indicates the removal rate of ammonia.

In this context, the second temperature area is the temperature area which provides the increasing amount of ammonia released from the SCR catalyst 7a and flowing out from SCRF 7 without being oxidized. In other words, if the temperature of SCRF 7 is in the second temperature area (for example, 500 to 600° C.), then ammonia adsorbed in the SCR catalyst 7 is released, but ammonia flows out as it is from SCRF 7 without being oxidized in SCRF 7.

Further, the first temperature area is the temperature area which is lower than the second temperature area. However, the post-catalyst 8 contains the oxidation catalyst, and hence the oxidizing ability thereof is higher than the oxidizing ability of the SCR catalyst 7a carried on SCRF 7. Therefore, if the temperature of the post-catalyst 8 is in the first temperature area (for example, 350 to 500° C.), then a part of supplied ammonia is oxidized, and $N_2$ and NOx are produced thereby. Further, the post-catalyst 8 includes the SCR catalyst. Therefore, if the temperature of the post-catalyst 8 is in the first temperature area, produced NOx is reduced by using excessive ammonia as the reducing agent. In accordance with the oxidation and reduction reactions as described above, if the temperature of the post-catalyst 8 is in the first temperature area as shown in FIG. 3, ammonia contained in the exhaust gas is removed by the post-catalyst 8.

In other words, in the period of time of ammonia removal in which the temperature of SCRF 7 is in the second temperature area and the temperature of the post-catalyst 8 is in the first temperature area, ammonia is released from the SCR catalyst 7a carried on SCRF 7, and released ammonia is removed from the exhaust gas by means of the post-catalyst 8.

The first temperature area and the second temperature area are the areas which are determined depending on the characteristics of the post-catalyst 8 and the SCR catalyst 7a, and the first temperature area and the second temperature area can be determined on the basis of, for example, experiments.

Further, the temperatures of SCRF 7 and the post-catalyst 8 are adjusted by controlling the temperature of the exhaust gas flowing into SCRF 7. The temperature of the exhaust gas flowing into SCRF 7 is controlled by controlling the fuel addition amount added from the fuel addition valve 4. Therefore, the temperature change of SCRF 7 is correlated with the temperature change of the post-catalyst 8. In other words, if the temperature of SCRF 7 is raised in accordance with the increase in the temperature of the exhaust gas flowing into SCRF 7, the temperature of the post-catalyst 8 is also raised. Further, if the temperature of SCRF 7 is lowered in accordance with the increase in the temperature of the exhaust gas flowing into SCRF 7, the temperature of the post-catalyst 8 is also lowered. Then, in this embodiment, SCRF 7 and the post-catalyst 8 are arranged at such positions that the temperature of the post-catalyst 8 is adjusted to be in the first temperature area if the temperature of SCRF 7 is adjusted to be in the second temperature area. Note that an electric heater, a burner or the like may be provided for the exhaust gas passage 8 on the upstream side from SCRF 7 to thereby control the temperature of the exhaust gas flowing into SCRF 7.

When the temperatures of SCRF 7 and the post-catalyst 8 are controlled as described above, it is possible to decrease ammonia adsorbed in the SCR catalyst 7a during the elapse of the period of time of ammonia removal. Therefore, it is possible to decrease the amount of NOx produced by the oxidation of ammonia when the temperature of SCRF 7 is raised to the filter regeneration temperature after the elapse of the period of time of ammonia removal. As a result, it is possible to suppress the discharge of NOx to the outside during the execution of the filter regeneration process.

(Flow of Filter Regeneration Process)

An explanation will be made on the basis of a flow chart shown in FIG. 4 about a flow of the filter regeneration process according to this embodiment. This flow is previously stored in ECU 10, and this flow is repeatedly executed by ECU 10.

In this flow, at first, in Step S101, it is judged whether or not the execution condition of the filter regeneration process is established. In this embodiment, if a predetermined time elapses after the completion of the previous execution of the filter regeneration process, it is judged that the execution condition of the filter regeneration process is established. If the negative judgment is made in Step S101, the execution of this flow is once completed. On the other hand, if the affirmative judgment is made in Step S101, the process of Step S102 is subsequently executed.

In Step S102, the fuel addition from the fuel addition valve 4 is executed. Accordingly, the temperature of the exhaust gas flowing into SCRF 7 is raised. In accordance therewith, the temperatures of SCRF 7 and the post-catalyst 8 are raised. Then, in Step S103, the temperature of the exhaust gas flowing into SCRF 7 is subsequently controlled. Thus, the temperature Tf of SCRF 7 is adjusted to be in the second temperature area, and the temperature Tdcat of the post-catalyst 8 is adjusted to be in the first temperature area.

Subsequently, in Step S104, it is judged whether or not the period of time of ammonia removal Δtm has elapsed after the temperature Tf of SCRF 7 is adjusted to be in the second temperature area and the temperature Tdcat of the post-catalyst 8 is adjusted to be in the first temperature area. In this embodiment, the length (duration) of the period of time of ammonia removal Δtm is a certain length which is previously determined on the basis of, for example, an experiment. The length of the period of time of ammonia removal Δtm is set to such a length that it is possible to judge that the length is sufficient to decrease the ammonia adsorption amount adsorbed in the SCR catalyst 7a to be not more than the first reference adsorption amount, if the temperature Tf of SCRF 7 is adjusted to be in the second temperature area and the temperature Tdcat of the post-catalyst 8 is adjusted to be in the first temperature area during the period of time of ammonia removal Δtm. In this context, the first reference adsorption amount is the upper limit value of the ammonia adsorption amount (amount indicated by Qab1 in FIG. 2) at which the outflow amount of NOx is within an allowable range even if the temperature of SCRF 7 becomes the filter regeneration temperature and ammonia adsorbed in the SCR catalyst 7 is thereby oxidized to produce NOx which flows out from SCRF 7.

If the negative judgment is made in Step S104, the process of Step S103 is executed again. On the other hand, if the affirmative judgment is made in Step S104, the process of Step S105 is subsequently executed. In Step S105, the temperature of the exhaust gas flowing into SCRF 7 is further raised, and the temperature Tf of SCRF 7 is adjusted to the filter regeneration temperature. Accordingly, PM accumulated on SCRF 7 is oxidized and removed. Note that if the temperature Tf of SCRF 7 is adjusted to the filter regeneration temperature, the temperature Tdcat of the post-catalyst 8 is necessarily raised as well.

Subsequently, in Step S106, it is judged whether or not the period of time of process execution Δto has elapsed after the temperature Tf of SCRF 7 is adjusted to the regeneration temperature. In this procedure, it is also allowable that the length of the period of time of process execution Δto is a certain length which is previously determined. In this case, the length of the period of time of process execution Δto is set to such a length that it is possible to judge that the length is sufficient to decrease the PM accumulation amount accumulated on SCRF 7 to be within an allowable range. Further, it is also allowable that the length of the period of time of process execution Δto is changed depending on the PM accumulation amount accumulated on SCRF 7 provided at the point in time at which the execution condition of the filter regeneration process is established.

If the negative judgment is made in Step S106, the process of Step S105 is executed again. On the other hand, if the affirmative judgment is made in Step S106, the fuel addition from the fuel addition valve 4 is subsequently stopped in Step S107. Accordingly, the execution of the filter regeneration process performed this time is completed.

In this embodiment, the post-catalyst 8 is the catalyst constructed by combining the oxidation catalyst and the SCR catalyst. However, the construction of the post-catalyst according to the present invention is not limited to the construction as described above. For example, it is also possible to use, as the post-catalyst, a catalyst which does not have the function to reduce NOx but which has such a function that the production of $N_2$ based on the oxidation of ammonia is facilitated in the predetermined first temperature area. Even when the catalyst as described above is used as the post-catalyst, then the temperature of the post-catalyst is adjusted to be in the first temperature area during the period of time of ammonia removal when the filter regeneration process is executed, and thus ammonia, which passes through SCRF, can be removed by converting ammonia into $N_2$ by means of the post-catalyst.

Second Embodiment (Flow of Filter Regeneration Process)

An explanation will be made on the basis of a flow chart shown in FIG. 5 about a flow of a filter regeneration process according to this embodiment. In this section, only the feature, which is different from that of the flow of the filter regeneration process according to the first embodiment, will be explained. In FIG. 5, the steps, in which the same or equivalent processes as those of the respective steps included in the flow chart shown in FIG. 4 are performed, are designated by the same reference numerals, any explanation of which will be omitted. Note that the schematic arrangement of the intake/exhaust system of the internal combustion engine according to this embodiment is the same as or equivalent to that of the first embodiment.

In this flow, if the affirmative judgment is made in Step S101, the process of S202 is subsequently executed. In Step S202, the ammonia adsorption amount Qfab at the present point in time of the SCR catalyst 7a carried on SCRF 7 is calculated. It is possible to estimate the ammonia adsorption amount per unit time to be adsorbed in the SCR catalyst 7a and the ammonia release amount per unit time to be released from the SCR catalyst 7a on the basis of, for example, the ammonia addition amount added from the ammonia addition valve 6, the flow rate of the exhaust gas flowing into SCRF 7, and the temperature of SCRF 7 (i.e., the temperature of the SCR catalyst 7a). Then, it is possible to calculate the ammonia adsorption amount Qfab in the SCR catalyst 7a by adding up the amounts as described above.

Subsequently, in Step S203, the length is set for the period of time of ammonia removal Δtm which is the period of time in which the temperature Tf of SCRF 7 is adjusted to be in the second temperature area and the temperature Tdcat of the post-catalyst 8 is adjusted to be in the first temperature area. In other words, in this embodiment, unlike the first embodiment, the length of the period of time of ammonia removal Δtm is variable, which is not constant. In Step S203, the length of the period of time of ammonia removal Δtm is set on the basis of the ammonia adsorption amount Qfab adsorbed in the SCR catalyst 7a calculated in Step S202.

The relationship between the ammonia adsorption amount Qfab adsorbed in the SCR catalyst 7a and the length of the period of time of ammonia removal Δtm is set on the basis of, for example, an experiment, and the relationship is previously stored as a map or a function in ECU 10. In the map or the function, the length of the period of time of ammonia removal Δtm is determined so that the ammonia adsorption amount Qfab adsorbed in the SCR catalyst 7a is decreased to the first reference adsorption amount if the temperature Tf of SCRF 7 is adjusted to be in the second temperature area during the period of time of ammonia removal Δtm. Therefore, in Step S203, the setting is made as follows. That is, the larger the ammonia adsorption amount Qfab adsorbed in the SCR catalyst 7a is, the longer the period of time of ammonia removal Δtm is. Further, the smaller the ammonia adsorption amount Qfab adsorbed in the SCR catalyst 7a is, the shorter the period of time of ammonia removal Δtm is.

Subsequently, in Step S102, the fuel addition from the fuel addition valve 4 is executed.

If the period of time of ammonia removal Δtm is prolonged, the timing, at which the oxidation of PM accumulated on the filter 7 is started, is delayed. In view of the above, in this embodiment, the length of the period of time of ammonia removal Δtm is set on the basis of the ammonia adsorption amount adsorbed in the SCR catalyst 7a at the point in time at which the execution condition of the filter regeneration process is established as in the flow described above.

Accordingly, it is possible to shorten the period of time of ammonia removal Δtm as short as possible. Therefore, the increase in the discharge amount of NOx to the outside can be suppressed during the execution of the filter regeneration process, which would be otherwise caused by such a situation that the period of time of ammonia removal Δtm is excessively shortened. Further, the decrease in the efficiency of the filter regeneration process can be also suppressed, which would be otherwise caused by such a situation that the period of time of ammonia removal Δtm is excessively prolonged.

Third Embodiment (Flow of Filter Regeneration Process)

An explanation will be made on the basis of a flow chart shown in FIG. 6 about a flow of a filter regeneration process according to this embodiment. In this section, only the feature, which is different from that of the flow of the filter regeneration process according to the first embodiment, will be explained. In FIG. 6, the steps, in which the same or equivalent processes as those of the respective steps included in the flow chart shown in FIG. 4 are performed, are designated by the same reference numerals, any explanation of which will be omitted. Note that the schematic arrangement of the intake/exhaust system of the internal combustion engine according to this embodiment is the same as or equivalent to that of the first embodiment.

In this flow, if the affirmative judgment is made in Step S101, the process of S302 is subsequently executed. In Step S302, the ammonia adsorption amount Qfab at the present point in time of the SCR catalyst 7a carried on SCRF 7 is calculated. The method for calculating the ammonia adsorption amount Qfab adopted in this procedure is the same as or equivalent to the method for calculating the ammonia adsorption amount in Step S202 in the flow chart shown in FIG. 5.

Subsequently, in Step S303, it is judged whether or not the ammonia adsorption amount Qfab adsorbed in the SCR catalyst 7a calculated in Step S302 is larger than the first reference adsorption amount Qab1. If the affirmative judgment is made in Step S303, the process of Step S102 is subsequently executed. On the other hand, if the negative judgment is made in Step S303, i.e., if the ammonia adsorption amount Qfab adsorbed in the SCR catalyst 7a provided at the present point in time is not more than the first reference adsorption amount Qab1, the process of Step S304 is subsequently executed.

In Step S304, the fuel addition from the fuel addition valve 4 is executed. Then, the process of Step S105 is subsequently executed. In other words, the temperature Tf of SCRF 7 is adjusted to the filter regeneration temperature.

If the ammonia adsorption amount adsorbed in the SCR catalyst 7a is not more than the first reference adsorption amount Qab1, then the temperature of SCRF 7 is raised to the filter regeneration temperature, and thus ammonia adsorbed to the SCR catalyst 7a is oxidized to produce NOx. Even when NOx flows out from SCRF 7, the outflow amount thereof is within an allowable range. Accordingly, in this embodiment, in the same manner as in the flow described above, if the ammonia adsorption amount adsorbed in the SCR catalyst 7a, which is provided at the point in time at which the execution condition of the filter regeneration process is established, is not more than the first reference adsorption amount Qab1, the temperature of SCRF 7 is adjusted to the filter regeneration temperature without performing the adjustment the temperature of SCRF 7 to be in the second temperature area and the adjustment the temperature of post-catalyst 8 to be in the first temperature area.

Accordingly, if the ammonia adsorption amount adsorbed in the SCR catalyst 7a, when the execution condition of the filter regeneration process is established, is not more than the first reference adsorption amount Qab1, the removal of PM accumulated on SCRF 7 is started as quickly as possible. Therefore, it is possible to improve the efficiency of the filter regeneration process, while suppressing the discharge of NOx to the outside to be within the allowable range during the execution of the filter regeneration process.

Fourth Embodiment (Flow of Filter Regeneration Process)

An explanation will be made on the basis of a flow chart shown in FIG. 7 about a flow of a filter regeneration process according to this embodiment. In this section, only the feature, which is different from that of the flow of the filter regeneration process according to the first embodiment, will be explained. In FIG. 7, the steps, in which the same or equivalent processes as those of the respective steps included in the flow chart shown in FIG. 4 are performed, are designated by the same reference numerals, any explanation of which will be omitted. Note that the schematic arrangement of the intake/exhaust system of the internal combustion engine according to this embodiment is the same as or equivalent to that of the first embodiment.

In this flow, if the affirmative judgment is made in Step S101, the process of S402 is subsequently executed. In Step S402, the ammonia adsorption amount Qfab at the present point in time adsorbed in the SCR catalyst 7a carried on SCRF 7 is calculated. The method for calculating the ammonia adsorption amount Qfab adopted in this procedure is the same as or equivalent to the method for calculating the ammonia adsorption amount in Step S202 in the flow chart shown in FIG. 5.

Subsequently, in Step S403, the ammonia adsorption amount Qdab at the present point in time adsorbed in the post-catalyst 8 is calculated. The post-catalyst 8 includes the SCR catalyst which reduces NOx by using ammonia as the reducing agent. Therefore, ammonia, which passes through SCRF 7, is adsorbed in the post-catalyst 8.

The ammonia amount per unit time passing through SCRF 7, i.e., the ammonia supply amount per unit time supplied to the post-catalyst 8 can be estimated on the basis of, for example, the ammonia addition amount added from the ammonia addition valve 6, the flow rate of the exhaust gas flowing into SCRF 7, and the temperature of SCRF 7 (i.e., the temperature of the SCR catalyst 7a). Further, the ammonia adsorption amount per unit time adsorbed in the post-catalyst 8 and the ammonia release amount per unit time released from the post-catalyst 8 can be estimated on the basis of, for example, the ammonia supply amount per unit time supplied to the post-catalyst 8, the flow rate of the exhaust gas flowing into the post-catalyst 8, and the temperature of the post-catalyst 8. Then, the ammonia adsorption amount Qdab adsorbed in the post-catalyst 8 can be calculated by adding up the amounts as described above.

Subsequently, in Step S404, the second reference adsorption amount Qab2 is calculated on the basis of the ammonia adsorption amount Qfab adsorbed in the SCR catalyst 7a as calculated in Step S402. In this case, the second reference adsorption amount Qab2 is the lower limit value of the ammonia adsorption amount at which NOx can be sufficiently reduced by means of the post-catalyst 8 if ammonia, which is adsorbed in the SCR catalyst 7a at the point in time of the establishment of the execution condition of the filter regeneration process, is oxidized into NOx in accordance with the increase in the temperature of SCRF 7 to the filter regeneration temperature and NOx flows into the post-catalyst 8.

The relationship between the ammonia adsorption amount Qfab adsorbed in the SCR catalyst 7a and the second reference adsorption amount Qab is determined on the basis of, for example, an experiment, and the relationship is previously stored as a map or a function in ECU 10. In the map or the function, the larger the value of the ammonia adsorption amount Qfab adsorbed in the SCR catalyst 7a is, the larger the value of the second reference adsorption amount Qab2 is.

Subsequently, in Step S405, it is judged whether or not the ammonia adsorption amount Qdab adsorbed in the post-catalyst 8 calculated in Step S403 is smaller than the second reference adsorption amount Qab2 calculated in Step S204. If the affirmative judgment is made in Step S405, the process of Step S102 is subsequently executed. On the other hand, if the negative judgment is made in Step S405, i.e., if the ammonia adsorption amount Qdab adsorbed in the post-catalyst 8 at the present point in time is not less than the second reference adsorption amount Qab2, the process of Step S406 is subsequently executed.

In Step S406, the fuel addition from the fuel addition valve 4 is executed. Then, the process of Step S105 is subsequently executed. In other words, the temperature Tf of SCRF 7 is adjusted to the filter regeneration temperature.

If the ammonia adsorption amount adsorbed in the post-catalyst 8 is not less than the second reference adsorption amount Qab2, NOx can be sufficiently reduced by means of the post-catalyst 8 even if ammonia, which is adsorbed to the SCR catalyst 7a, is oxidized to produce NOx in accordance with the increase in the temperature of SCRF 7 to the filter regeneration temperature and NOx flows out from SCRF 7. Therefore, the amount of NOx flowing out from the post-catalyst 8 can be within the allowable range.

Accordingly, in this embodiment, in the same manner as in the flow as described above, if the ammonia adsorption amount adsorbed in the post-catalyst 8, which is provided at the point in time at which the execution condition of the filter regeneration process is established, is not less than the second reference adsorption amount Qab2, the temperature of SCRF 7 is adjusted to the filter regeneration temperature without performing the adjustment the temperature of SCRF 7 to be in the second temperature area and the post-catalyst 8 to the adjustment the temperature of post-catalyst be in the first temperature area.

Accordingly, if the ammonia adsorption amount adsorbed in the post-catalyst 8, when the execution condition of the filter regeneration process is established, is not less than the second reference adsorption amount Qab2, the removal of PM accumulated on SCRF 7 is started as promptly as possible. Therefore, it is possible to improve the efficiency of the filter regeneration process, while suppressing the discharge of NOx to the outside to be within the allowable range during the execution of the filter regeneration process.

Note that the respective embodiments described above can be combined with each other as far as possible.

DESCRIPTION OF THE REFERENCE SIGNS

1: internal combustion engine
2: intake gas passage
3: exhaust gas passage
4: fuel addition valve
5: pre-catalyst
6: ammonia addition valve
7: filter (SCRF)
7a: selective catalytic reduction NOx catalyst (SCR catalyst)
8: post-catalyst
10: ECU
11: air flow meter
12: first exhaust gas temperature sensor
13: second exhaust gas temperature sensor

The invention claimed is:
1. An exhaust gas purification system for an internal combustion engine, comprising:
a pre-catalyst which is provided for an exhaust gas passage of the internal combustion engine and which has an oxidizing function;
a fuel supplier configured to supply fuel to the pre-catalyst;

a filter which is provided for the exhaust gas passage on a downstream side from the pre-catalyst and which traps particulate matter contained in an exhaust gas, the filter including a selective catalytic reduction NOx catalyst carried thereon for reducing NOx contained in the exhaust gas by using ammonia as a reducing agent;

an ammonia supplier configured to supply ammonia or an ammonia precursor to the filter;

a post-catalyst which is provided for the exhaust gas passage on a downstream side from the filter, which has an oxidizing function, and which has such a function that production of $N_2$ based on oxidization of ammonia is facilitated in a predetermined first temperature area; and an electronic control unit programmed to execute a filter regeneration process for raising a temperature of the filter to a predetermined filter regeneration temperature at which oxidation of the particulate matter is facilitated, by supplying the fuel from the fuel supplier to the pre-catalyst so that the particulate matter accumulated on the filter is thereby oxidized and removed, wherein:

the electronic control unit is programmed to control a temperature of the exhaust gas flowing into the filter, when the electronic control unit executes the filter regeneration process, so that, during a certain period of time, the temperature of the filter is adjusted to be in a predetermined second temperature area which is lower than the filter regeneration temperature and which provides an increasing amount of ammonia released from the carried selective catalytic reduction NOx catalyst and flowing out from the filter without being oxidized, a temperature of the post-catalyst is adjusted to be in the first temperature area, and then adjusts the temperature of the filter to the filter regeneration temperature.

2. The exhaust gas purification system for the internal combustion engine according to claim 1, wherein the post-catalyst is constructed to include an oxidation catalyst and a selective catalytic reduction NOx catalyst for reducing NOx contained in the exhaust gas by using ammonia as a reducing agent, and the post-catalyst has such a function that, in the first temperature area, NOx is produced by oxidizing ammonia and the produced NOx is reduced by using excessive ammonia as the reducing agent.

3. The exhaust gas purification system for the internal combustion engine according to claim 1, wherein the electronic control unit is programmed to estimate an ammonia adsorption amount adsorbed in the selective catalytic reduction NOx catalyst carried on the filter, and set a length of the period of time on the basis of the ammonia adsorption amount adsorbed in the selective catalytic reduction NOx catalyst carried on the filter when an execution condition of the filter regeneration process is established.

4. The exhaust gas purification system for the internal combustion engine according to claim 1, wherein the electronic control unit is programmed to estimate an ammonia adsorption amount adsorbed in the selective catalytic reduction NOx catalyst carried on the filter, and adjust the temperature of the filter to the filter regeneration temperature without performing the adjustment of the temperature of the filter to be in the second temperature area and the adjustment of the temperature of the post-catalyst to be in the first temperature area, if an ammonia adsorption amount adsorbed in the selective catalytic reduction NOx catalyst carried on the filter, when an execution condition of the filter regeneration process is established, is not more than a first reference adsorption amount.

5. The exhaust gas purification system for the internal combustion engine according to claim 2, wherein the electronic control unit is programmed to estimate an ammonia adsorption amount adsorbed in the selective catalytic reduction NOx catalyst carried on the filter, estimate an ammonia adsorption amount adsorbed in the post-catalyst, and adjust the temperature of the filter to the filter regeneration temperature without performing the adjustment of the temperature of the filter to be in the second temperature area and the adjustment of the temperature of the post-catalyst to be in the first temperature area, if an ammonia adsorption amount adsorbed in the post-catalyst, when an execution condition of the filter regeneration process is established, is not less than a second reference adsorption amount which is determined depending on an ammonia adsorption amount adsorbed in the selective catalytic reduction NOx catalyst carried on the filter when the execution condition of the filter regeneration process is established.

6. The exhaust gas purification system for the internal combustion engine according to claim 2, wherein the electronic control unit is programmed to estimate an ammonia adsorption amount adsorbed in the selective catalytic reduction NOx catalyst carried on the filter, and set a length of the period of time on the basis of the ammonia adsorption amount adsorbed in the selective catalytic reduction NOx catalyst carried on the filter when an execution condition of the filter regeneration process is established.

7. The exhaust gas purification system for the internal combustion engine according to claim 2, wherein the electronic control unit is programmed to estimate an ammonia adsorption amount adsorbed in the selective catalytic reduction NOx catalyst carried on the filter, and adjust the temperature of the filter to the filter regeneration temperature without performing the adjustment of the temperature of the filter to be in the second temperature area and the adjustment of the temperature of the post-catalyst to be in the first temperature area, if an ammonia adsorption amount adsorbed in the selective catalytic reduction NOx catalyst carried on the filter, when an execution condition of the filter regeneration process is established, is not more than a first reference adsorption amount.

\* \* \* \* \*